United States Patent
Fujii

(10) Patent No.: US 9,666,373 B2
(45) Date of Patent: *May 30, 2017

(54) VOLTAGE SMOOTHING CIRCUIT, VOLTAGE CONVERSION CIRCUIT, AND METHOD FOR CONTROLLING VOLTAGE TO BE APPLIED TO MULTILAYER CAPACITOR

(71) Applicant: Murata Manufacturing Co., Ltd., Nagaokakyo-shi, Kyoto-fu (JP)

(72) Inventor: Yasuo Fujii, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 98 days.

This patent is subject to a terminal disclaimer.

(21) Appl. No.: 14/701,843

(22) Filed: May 1, 2015

(65) Prior Publication Data
US 2015/0326109 A1    Nov. 12, 2015

(30) Foreign Application Priority Data

May 9, 2014 (JP) .................. 2014-097517

(51) Int. Cl.
*H01G 4/30* (2006.01)
*H02M 1/14* (2006.01)
(Continued)

(52) U.S. Cl.
CPC .............. *H01G 4/30* (2013.01); *H01G 4/012* (2013.01); *H01G 4/232* (2013.01); *H01G 4/248* (2013.01);
(Continued)

(58) Field of Classification Search
CPC ........ H01G 4/012; H01G 4/232; H01G 4/248; H01G 4/30; H01G 4/385; H02M 1/14; H02M 3/04
See application file for complete search history.

(56) References Cited

U.S. PATENT DOCUMENTS

2015/0014036 A1* 1/2015 Park .................. H01G 4/30
 174/260
2015/0200056 A1* 7/2015 Koller .................. H01G 4/30
 323/304

FOREIGN PATENT DOCUMENTS

JP      04-044131 U     4/1992
JP      2002-232110 A   8/2002
JP      2013-258278 A   12/2013

OTHER PUBLICATIONS

Official Communication issued in corresponding Japanese Patent Application No. 2014-097517, mailed on Oct. 4, 2016.

* cited by examiner

*Primary Examiner* — Adolf Berhane
*Assistant Examiner* — Bart Iliya
(74) *Attorney, Agent, or Firm* — Keating & Bennett, LLP

(57) ABSTRACT

A voltage smoothing circuit includes a multilayer capacitor including a first capacitance unit and a second capacitance unit and a regulator including an input terminal which is electrically connected to the second capacitance unit and an output terminal which is electrically connected to the first capacitance unit. The regulator calculates a first voltage which is applied to the first capacitance unit based on a second voltage which is applied to the second capacitance unit from the input terminal such that a potential difference which is applied to the first capacitance unit decreases or increases when a potential difference which is applied to the second capacitance unit increases or decreases, and outputs the first voltage from the output terminal.

19 Claims, 12 Drawing Sheets

(51) Int. Cl.
*H02M 3/04* (2006.01)
*H01G 4/248* (2006.01)
*H01G 4/012* (2006.01)
*H01G 4/38* (2006.01)
*H01G 4/232* (2006.01)

(52) U.S. Cl.
CPC .............. *H01G 4/385* (2013.01); *H02M 1/14* (2013.01); *H02M 3/04* (2013.01)

| Vmon | VALUE OF Ro AS OFFSET RESISTOR | AMPLIFICATION FACTOR Rf/Rs |
|---|---|---|
| c 1 | r 1 | z 1 |
| c 2 | r 2 | z 2 |
| ⋮ | ⋮ | ⋮ |
| ⋮ | ⋮ | ⋮ |

VOLTAGE SMOOTHING CIRCUIT, VOLTAGE CONVERSION CIRCUIT, AND METHOD FOR CONTROLLING VOLTAGE TO BE APPLIED TO MULTILAYER CAPACITOR

BACKGROUND OF THE INVENTION

1. Field of the Invention

The present invention relates to a voltage smoothing circuit, a method for controlling a voltage to be applied to a multilayer capacitor that is used in the voltage smoothing circuit, and a voltage conversion circuit.

2. Description of the Related Art

Increase in capacitance of a multilayer ceramic capacitor has been advanced to thus enable a power supply voltage of an electronic apparatus to be used as a smoothing capacitor. Further, with recent advancement in size reduction of the electronic apparatus, usage of the multilayer ceramic capacitor having large capacitance and reduced size has further increased. Ceramic materials used in the multilayer ceramic capacitor have piezoelectricity and an electrostrictive property. Accordingly, distortion is generated thereon when a voltage is applied. In particular, when an alternating current (AC) voltage or a direct-current (DC) voltage on which an AC component is superimposed is applied to the multilayer ceramic capacitor having large capacitance, vibration is generated due to the above-mentioned distortion in some cases. This results in vibration of a circuit board on which the multilayer ceramic capacitor is mounted and acoustic noise" is generated in some cases.

Japanese Unexamined Patent Application Publication No. 2013-258278 discloses a method for driving a multilayer ceramic capacitor in which a first capacitance unit and a second capacitance unit are laminated. Japanese Unexamined Patent Application Publication No. 2013-258278 indicates that the above-mentioned acoustic noise is suppressed by driving the first capacitance unit and the second capacitance unit in opposite phases.

However, distortion on the first capacitance unit and distortion on the second capacitance unit cannot be completely cancelled by each other even by using the driving method as described in Japanese Unexamined Patent Application Publication No. 2013-258278. Accordingly, when a circuit is formed using the above-mentioned multilayer capacitor, distortion tends to be generated on an output voltage.

SUMMARY OF THE INVENTION

Accordingly, preferred embodiments of the present invention provide a voltage smoothing circuit including a multilayer capacitor and capable of reducing distortion on the multilayer capacitor as a whole so as to reduce acoustic noise and a voltage conversion circuit including the voltage smoothing circuit.

Also, preferred embodiments of the present invention provide a method for controlling a voltage to be applied to the multilayer capacitor in the voltage smoothing circuit including the multilayer capacitor.

According to a preferred embodiment of the present invention, a voltage smoothing circuit for smoothing a voltage includes a multilayer capacitor which includes a first capacitance unit and a second capacitance unit and a regulator which includes an input terminal and an output terminal. The input terminal is electrically connected to the second capacitance unit, and the output terminal is electrically connected to the first capacitance unit. The regulator calculates a first voltage which is applied to the first capacitance unit based on a second voltage which is applied to the input terminal such that a potential difference which is applied to the first capacitance unit decreases when a potential difference which is applied to the second capacitance unit increases and the potential difference which is applied to the first capacitance unit increases when the potential difference which is applied to the second capacitance unit decreases, and outputs the first voltage from the output terminal.

In a specific aspect of the voltage smoothing circuit according to various preferred embodiments of the present invention, each of the first capacitance unit and the second capacitance unit includes an end portion at a high-voltage side and an end portion at a low-voltage side, the end portion of the second capacitance unit at the high-voltage side is electrically connected to the first capacitance unit, and the first voltage is higher than the second voltage.

In another specific aspect of the voltage smoothing circuit according to various preferred embodiments of the present invention, the regulator calculates the first voltage while an average value of voltages that are input in a predetermined period of time is set as the second voltage.

In still another specific aspect of the voltage smoothing circuit according to various preferred embodiments of the present invention, the regulator calculates the first voltage while a voltage that has been actually input is set as the second voltage.

In still another specific aspect of the voltage smoothing circuit according to various preferred embodiments of the present invention, each of the first capacitance unit and the second capacitance unit includes an end portion at a high-voltage side and an end portion at a low-voltage side, and the end portion of the first capacitance unit at the low-voltage side is electrically connected to the end portion of the second capacitance unit at the low-voltage side.

In still another specific aspect of the voltage smoothing circuit according to various preferred embodiments of the present invention, the regulator includes an inverting amplification circuit and the inverting amplification circuit outputs an output voltage with a phase inverted with respect to a phase of an input voltage.

In still another specific aspect of the voltage smoothing circuit according to various preferred embodiments of the present invention, a first memory storing a first correspondence table containing a correspondence relationship between the input voltage of the inverting amplification circuit defining and serving as the second voltage and an amplification factor or an offset resistance value is further provided, and the regulator controls a magnitude of the first voltage based on the first correspondence table.

In still another specific aspect of the voltage smoothing circuit according to various preferred embodiments of the present invention, a second memory storing a second correspondence table containing a correspondence relationship between the second voltage and the first voltage corresponding to the second voltage is further provided, and the regulator outputs the first voltage corresponding to the second voltage based on the second correspondence table.

In still another specific aspect of the voltage smoothing circuit according to various preferred embodiments of the present invention, the multilayer capacitor includes a multilayer body including a stack of a plurality of dielectric layers, a first inner electrode, a second inner electrode, and a third inner electrode located in the multilayer body, and a first outer electrode, a second outer electrode, and a third outer electrode provided on outer surfaces of the multilayer body. The first outer electrode, the second outer electrode, and the third outer electrode are electrically connected to the first inner electrode, the second inner electrode, and the third inner electrode, respectively. Further, the first capacitance unit includes a portion on which the first inner electrode and the third inner electrode oppose each other with the dielectric layer interposed therebetween. A second capacitance unit includes a portion on which the second inner electrode and the third inner electrode oppose each other with the dielectric layer interposed therebetween.

In still another specific aspect of the voltage smoothing circuit according to various preferred embodiments of the present invention, the first capacitance unit and the second capacitance unit are arranged in a stacking direction in the multilayer capacitor.

In still another specific aspect of the voltage smoothing circuit according to various preferred embodiments of the present invention, the first capacitance unit and the second capacitance unit extend in a direction perpendicular or substantially perpendicular to the stacking direction in the multilayer capacitor.

According to another preferred embodiment of the present invention, a voltage conversion circuit includes a power supply, a voltage conversion circuit unit connected to the power supply, and a multilayer capacitor connected to at least one of an input side and an output side of the voltage conversion circuit unit, wherein the voltage smoothing circuit according to one of the preferred embodiments of the present invention described above is provided including the multilayer capacitor.

According to still another preferred embodiment of the present invention, a method for controlling a voltage to be applied to a multilayer capacitor includes steps of: detecting a second voltage which is applied to a second capacitance unit of the multilayer capacitor including a first capacitance unit and the second capacitance unit; calculating a first voltage based on the detected second voltage such that a potential difference which is applied to the first capacitance unit decreases when a potential difference which is applied to the second capacitance unit increases and the potential difference which is applied to the first capacitance unit increases when the potential difference which is applied to the second capacitance unit decreases; and applying the calculated first voltage to the first capacitance unit.

The voltage smoothing circuit, the voltage conversion circuit, and the method for controlling the voltage to be applied to the multilayer capacitor according to various preferred embodiments of the present invention effectively reduce or prevent distortion on the multilayer capacitor as a whole and reduce or prevent acoustic noise. In addition, a voltage that is output from the voltage smoothing circuit is smoothened.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, the present invention will be made clear by describing specific embodiments of the present invention with reference to the drawings.

Figure 2:
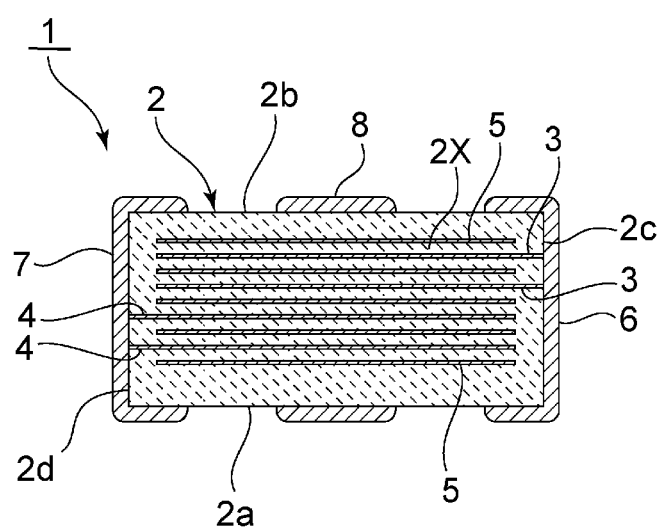
FIG. 2 is a front cross-sectional view illustrating a multilayer capacitor that is used in the voltage smoothing circuit in the first preferred embodiment of the present invention.
Figure 3A:
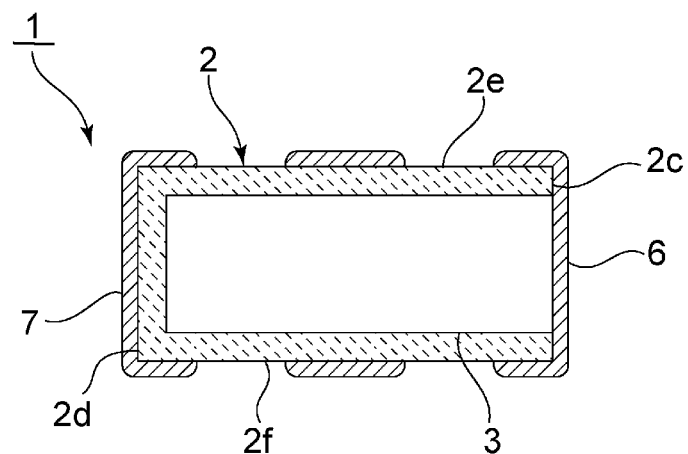
FIGS. 3A to 3C are planar cross-sectional views illustrating the multilayer capacitor that is included in the first preferred embodiment of the present invention.
Figure 3B:
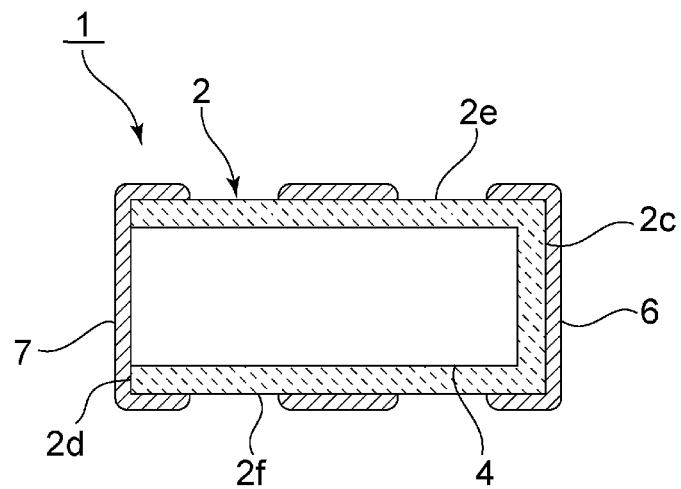
Figure 3C:
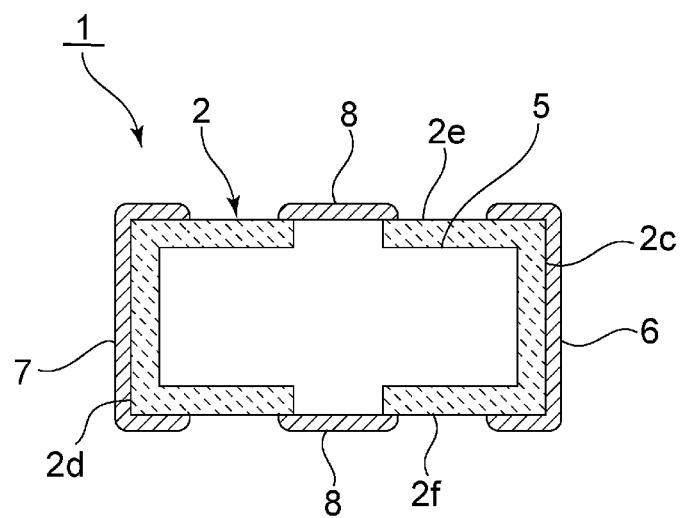

FIG. 2 is a front cross-sectional view illustrating a multilayer capacitor that is included in a first preferred embodiment of the present invention and FIGS. 3A to 3C are planar cross-sectional views thereof.

A multilayer capacitor 1 includes a multilayer body 2. The multilayer body 2 preferably has a rectangular or substantially rectangular parallelepiped shape. The multilayer body 2 includes a first principal surface 2a defining and serving as a mounting surface that is mounted on a circuit board or the like and a second principal surface 2b opposing the first principal surface 2a. The multilayer body 2 includes a first end surface 2c and a second end surface 2d that oppose each other. Further, the multilayer body 2 includes a first side surface 2e and a second side surface 2f that oppose each other.

The multilayer body 2 has a structure in which dielectric layers 2X, first inner electrodes 3, second inner electrodes 4, and third inner electrodes 5, which will be described later, are stacked. The dielectric layers 2X are formed of appropriate dielectric ceramics. The dielectric ceramics is preferably ceramics having a high relative dielectric constant in order to increase the capacitance. Examples of the preferable ceramics include barium titanate-based ceramics. As will be described later, use of the ceramics having a high relative dielectric constant causes the above-mentioned "acoustic noise" to be generated easily. Therefore, preferred embodiments of the present invention are more effective.

The first inner electrodes 3 to the third inner electrodes 5 are arranged in parallel or substantially in parallel with the first principal surface 2a and the second principal surface 2b. The first inner electrodes 3 to the third inner electrodes 5 can be formed using an appropriate metal or alloy.

A portion on which the first inner electrodes 3 and the third inner electrodes 5 oppose each other via the dielectric layers defines a first capacitance unit. A portion on which the second inner electrodes 4 and the third inner electrodes 5 oppose each other through the dielectric layers defines a second capacitance unit.

The first inner electrodes 3 extend to the first end surface 2c. A first outer electrode 6 covers the first end surface 2c. The first inner electrodes 3 are electrically connected to the first outer electrode 6. Meanwhile, the second inner electrodes 4 extend to the second end surface 2d. A second outer electrode 7 is provided on the second end surface 2d. The second inner electrodes 4 are electrically connected to the second outer electrode 7. The third inner electrodes 5 extend to the first side surface 2e and the second side surface 2f of the multilayer body 2. Third outer electrodes 8 are provided on the first side surface 2e and the second side surface 2f.

The first to third outer electrodes 6 to 8 can be formed using an appropriate metal or alloy.

As described in Japanese Unexamined Patent Application Publication No. 2013-258278, in the multilayer capacitor 1 of this type, distortion that is generated on the first capacitance unit and distortion that is generated on the second capacitance unit are capable of being cancelled by each other by driving the first capacitance unit and the second capacitance unit in the opposite phases so as to reduce the distortion as a whole at any rate. However, the present applicants have discovered the following. That is, the distortion on the multilayer capacitor 1 as a whole still remains and the method is unable to sufficiently reduce or prevent acoustic noise that is generated from the circuit board on which the multilayer capacitor 1 is mounted.

Hereinafter, the voltage smoothing circuit according to the first preferred embodiment of the present invention will be described in further detail with reference to FIGS. 1A and 1B.

A voltage smoothing circuit 11 in the present preferred embodiment is connected to a direct current (DC) power supply 12. To be more specific, a portion enclosed by a dashed line in FIG. 1A corresponds to the voltage smoothing circuit 11 in the present preferred embodiment. The voltage smoothing circuit 11 includes the above-described multilayer capacitor 1 and a regulator 13. The regulator 13 includes an input terminal 13a and an output terminal 13b.

A first capacitance unit C1 and a second capacitance unit C2 of the multilayer capacitor 1 are connected in series. The regulator 13 is connected between the first outer electrode 6 of the multilayer capacitor 1 and the DC power supply 12. An input voltage is applied to the input terminal 13a of the regulator 13 from the DC power supply 12. As will be described later, an average value of the input voltages in a predetermined period of time is set as a second voltage Vmon in the present preferred embodiment. The regulator 13 is a voltage conversion circuit, which converts the second voltage Vmon and outputs a first voltage Vreg from the output terminal 13b. The first voltage Vreg is applied to the first capacitance unit C1 through the first outer electrode 6.

The second voltage Vmon is applied to a node 15 between the first capacitance unit C1 and the second capacitance unit C2. In the present preferred embodiment, Vmon is lower than Vreg. Accordingly, an end portion of the first capacitance unit C1 at the node 15 side corresponds to an end portion at the low-voltage side and an end portion of the first capacitance unit C1 at the first outer electrode 6 side corresponds to an end portion at the high-voltage side. An end portion of the second capacitance unit C2 at the node 15 side corresponds to an end portion at the high-voltage side and an end portion of the second capacitance unit C2 at the second outer electrode 7 side corresponds to an end portion at the low-voltage side.

Therefore, in the present preferred embodiment, the end portion of the first capacitance unit C1 at the low-voltage side and the end portion of the second capacitance unit C2 at the high-voltage side are connected. A load 14 is connected between the node 15 and the second outer electrode 7. That is to say, an output of the voltage smoothing circuit 11 is applied to the load 14. The output voltage applied to the load 14 is smoothed by the second capacitance unit C2.

It should be noted that although Vmon is lower than Vreg in the present preferred embodiment, Vmon may be higher than Vreg. Further, the end portion of the second capacitance unit C2 at the high-voltage side is capable of being connected to the end portion of the first capacitance unit C1 at the high-voltage side.

Although the electrical connection between the first capacitance unit C1 and the second capacitance unit C2 preferably is established in the multilayer capacitor 1, that is, through the third inner electrodes 5 and the third outer electrodes 8, for example, the electric connection may be established using an electric wire on the circuit board on which the multilayer capacitor 1 is mounted.

As described in Japanese Unexamined Patent Application Publication No. 2013-258278, even when the first capacitance unit and the second capacitance unit are driven in the opposite phases, expansion and contraction on the first capacitance unit and the second capacitance unit cannot be completely cancelled by each other for the following reason. That is, a voltage distortion curve indicating a relationship between a potential difference which is applied and the distortion is non-linear for each of the first capacitance unit and the second capacitance unit.

In contrast, in the present preferred embodiment, even when the voltage distortion curve is non-linear, distortion on the multilayer capacitor 1 as a whole is effectively reduced as will be described below.

As described above, in the present preferred embodiment, the average value of the voltages that are input in the predetermined period of time is calculated to be set as the second voltage Vmon.

A potential difference $\Delta V2$ which is applied to the second capacitance unit C2 is the second voltage Vmon. Meanwhile, a potential difference $\Delta V1$ which is applied to the first capacitance unit C1 is obtained by subtracting the second voltage Vmon from the first voltage Vreg.

The regulator 13 calculates the first voltage Vreg which is output based on the given second voltage Vmon such that when the potential difference $\Delta V2$ increases, $\Delta V1$ decreases whereas when $\Delta V2$ decreases, $\Delta V1$ increases, and outputs the first voltage Vreg.

Figure 1:
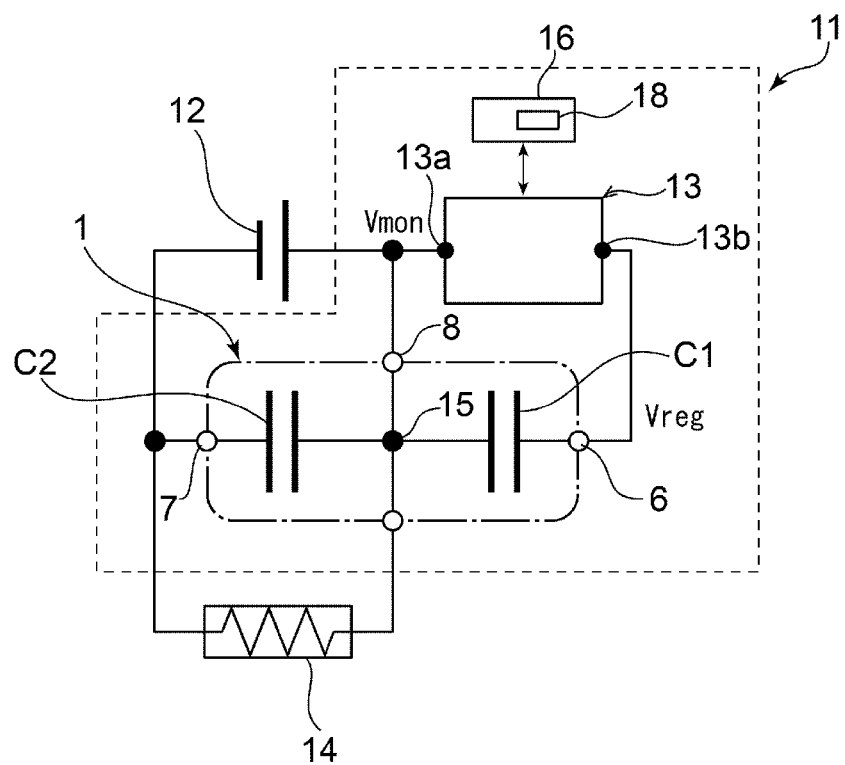
FIG. 1A is a circuit diagram illustrating a voltage smoothing circuit according to a first preferred embodiment of the present invention.
FIG. 1B is a view illustrating a second correspondence table.

FIG. 1B illustrates a second correspondence table 18. The second correspondence table 18 contains a correspondence relationship between the second voltage Vmon and the first voltage Vreg corresponding to the second voltage Vmon. The second correspondence table 18 is stored in advance in a memory 16. That is to say, the correspondence relationship between the second voltage and the first voltage in which when $\Delta V2$ increases, $\Delta V1$ decreases and when $\Delta V2$ decreases, $\Delta V1$ increases is stored in advance. The regulator 13 calculates the first voltage Vreg corresponding to the second voltage Vmon using the second correspondence table 18 and outputs the first voltage Vreg.

Figure 4:
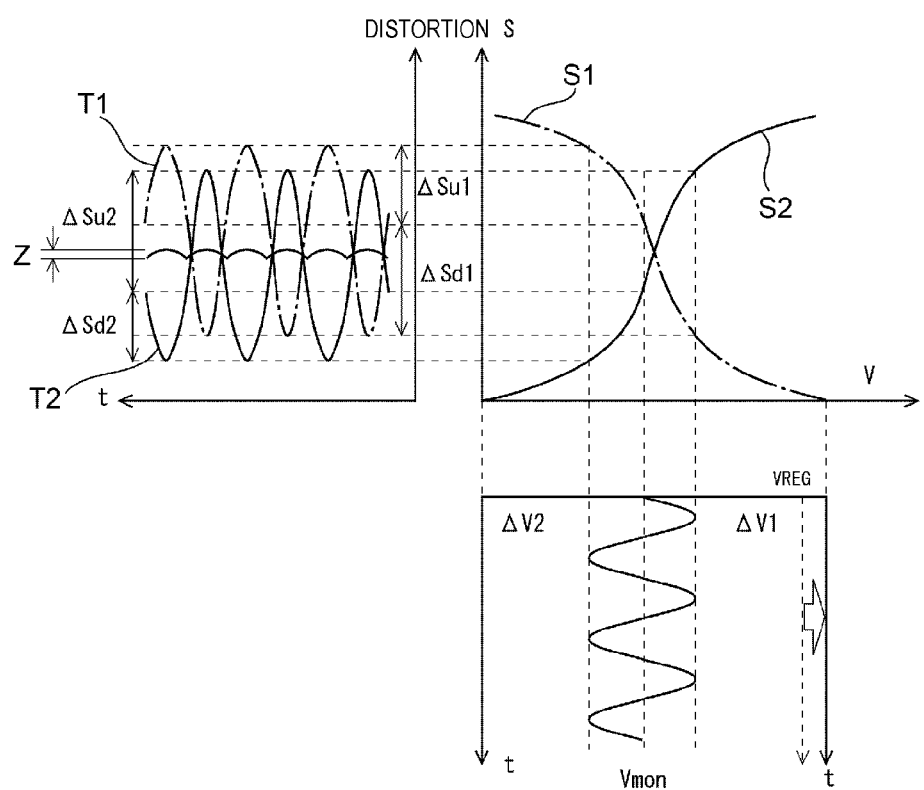
FIG. 4 is a view for explaining a relationship between potential differences which are applied to a first capacitance unit and a second capacitance unit and distortions thereon in the voltage smoothing circuit in the first preferred embodiment of the present invention.

That the distortion on the multilayer capacitor 1 as a whole is reduced will be described in further detail with reference to FIG. 4. A curve S2 in FIG. 4 is a voltage distortion curve indicating a relationship between a voltage which is applied to the second capacitance unit C2 and distortion thereon. A curve S1 is a voltage distortion curve indicating a relationship between a voltage which is applied to the first capacitance unit C1 and distortion thereon. The curve S1 and the curve S2 are similar curves but the curve S1 is illustrated in a right and left inverted mode with respect to the curve S2 while the first voltage Vreg is set as a reference for the convenience of explanation because the voltage which is applied to the first capacitance unit C1 is the potential difference between the first voltage Vreg (constant) and the second voltage Vmon (variable). Both of the voltage distortion curve S1 and the voltage distortion curve S2 are non-linear. Accordingly, even when the first capacitance unit C1 and the second capacitance unit C2 are driven simply in the opposite phases, distortion on the multilayer capacitor 1 as a whole remains. Therefore, it is difficult to further reduce the distortion on the multilayer capacitor 1 as a whole.

A graph at the left side of the voltage distortion curves S1 and S2 in FIG. 4 indicates a time change in the distortion on each of the first capacitance unit C1 and the second capacitance unit C2. A curve T1 and a curve T2 indicate time changes in the distortion on the first capacitance unit C1 and the distortion on the second capacitance unit C2, respectively. The second voltage Vmon changes with a variation in the load 14. Accordingly, positive distortion $\Delta Su1$ and negative distortion $\Delta Sd1$ are generated on the first capacitance unit C1 due to the change in the second voltage Vmon. Positive distortion $\Delta Su2$ and negative distortion $\Delta Sd2$ are generated on the second capacitance unit C2.

It should be noted that the positive distortion indicates distortion in the direction in which the distortion increases, for example, and the negative distortion indicates distortion in the direction in which the distortion decreases.

The first capacitance unit C1 and the second capacitance unit C2 are driven in the opposite phases but the voltage distortion curves S1 and S2 are non-linear as described above. Therefore, the magnitude of the positive distortion $\Delta Su1$ and the magnitude of the negative distortion $\Delta Sd1$ on the first capacitance unit C1 are different. In the same manner, the magnitude of the positive distortion $\Delta Su2$ and the magnitude of the negative distortion $\Delta Sd2$ on the second capacitance unit C2 are also different. Accordingly, the distortion on the first capacitance unit C1 and the distortion on the second capacitance unit C2 are not completely cancelled by each other.

However, in the present preferred embodiment, when the potential difference $\Delta V2$ has increased or decreased, the potential difference $\Delta V1$ is decreased or increased while offsetting the first voltage Vreg, thus significantly reducing a residual component Z defining and serving as a difference therebetween. This further reduces the distortion on the multilayer capacitor 1 as a whole and significantly reduces or prevents acoustic noise.

Figure 5:
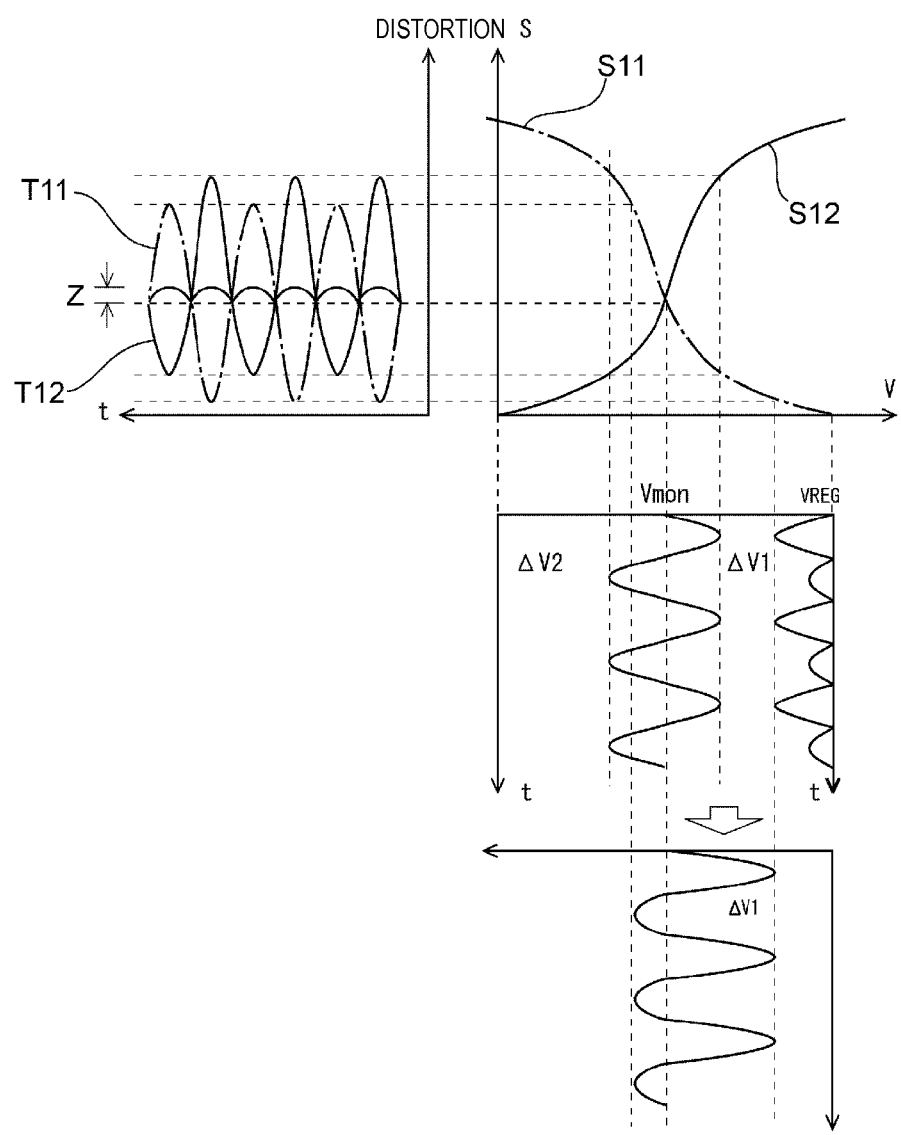
FIG. 5 is a view for explaining a relationship between potential differences which are applied to a first capacitance unit and a second capacitance unit and distortions thereon in a voltage smoothing circuit according to a second preferred embodiment of the present invention.

FIG. 5 is a view for explaining a voltage control method of a multilayer capacitor by a regulator in a voltage smoothing circuit according to a second preferred embodiment of the present invention. In the second preferred embodiment, the multilayer capacitor 1 same as that in the first preferred embodiment is used. The second preferably embodiment is different from the first preferred embodiment in how the second voltage Vmon is calculated. Accordingly, the voltage smoothing circuit in the second preferred embodiment is the same as the voltage smoothing circuit 11 described in the first preferred embodiment.

In the second preferred embodiment, an input voltage that is actually applied to the regulator 13 is set as the second voltage Vmon. That is to say, the average value in the predetermined period of time is not used but a voltage that is actually applied to the input terminal 13a is set as the second voltage Vmon.

In the second preferred embodiment as well, the regulator 13 is connected to the memory 16 storing the second correspondence table 18. The first voltage Vreg corresponding to the given second voltage Vmon is output from the output terminal 13b.

As illustrated in FIG. 5, in the second preferred embodiment as well, voltage distortion curves S11 and S12 are non-linear. It should be noted that the voltage distortion curves S11 and S12 are voltage distortion curves of the first capacitance unit C1 and the second capacitance unit C2, respectively.

In FIG. 5, curves T11 and T12 indicating time changes in the distortions on the first capacitance unit C1 and the second capacitance unit C2, respectively, are illustrated at the left side of the voltage distortion curves S11 and S12. The voltage distortion curves S11 and S12 are non-linear, so that the distortion on the multilayer capacitor as a whole cannot be eliminated by cancellation of the distortions by each other. That is to say, the residual component Z is generated.

In the present preferred embodiment, the above-described regulator 13 outputs, from the output terminal 13b, the first voltage Vreg corresponding to the second voltage Vmon applied to the input terminal 13a in accordance with the second voltage Vmon stored in the second correspondence table 18. The correspondence relationship stored in the second correspondence table 18 is defined such that when the potential difference $\Delta V2$ which is applied to the second capacitance unit C2 increases, the potential difference $\Delta V1$ which is applied to the first capacitance unit C1 decreases and when the potential difference $\Delta V2$ decreases, the potential difference $\Delta V1$ increases, as described above.

Accordingly, the potential difference $\Delta V2$ and the potential difference $\Delta V1$ change with a change in time t as illustrated at the lower side of the voltage distortion curves S11 and S12 in FIG. 5. The change in the potential difference $\Delta V1$ over time is illustrated on a lowermost portion in FIG. 5.

As in the second preferred embodiment, the first voltage Vreg as a control voltage may be output while being controlled in real time in accordance with the second voltage Vmon that is actually input. With this, the voltage that is applied to the multilayer capacitor 1 is controlled more finely than in the first preferred embodiment to further reduce the distortion on the multilayer capacitor 1 as a whole and significantly reduce or prevent acoustic noise.

Figures 6A, 6B:
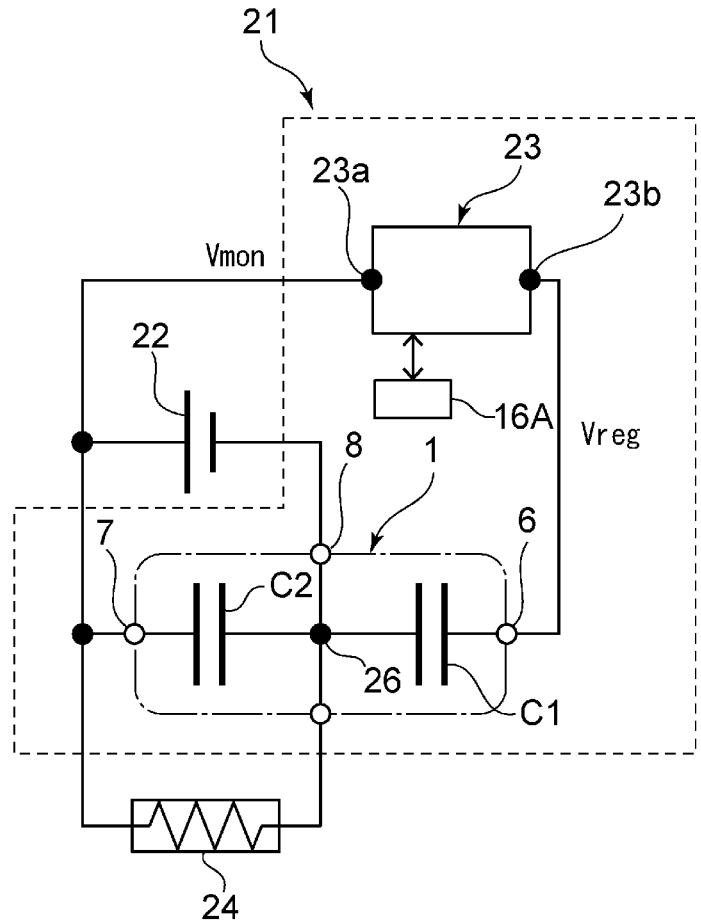
FIG. 6A is a circuit diagram illustrating a voltage smoothing circuit according to a third preferred embodiment of the present invention.
FIG. 6B is a view illustrating a first correspondence table.
Figure 7:
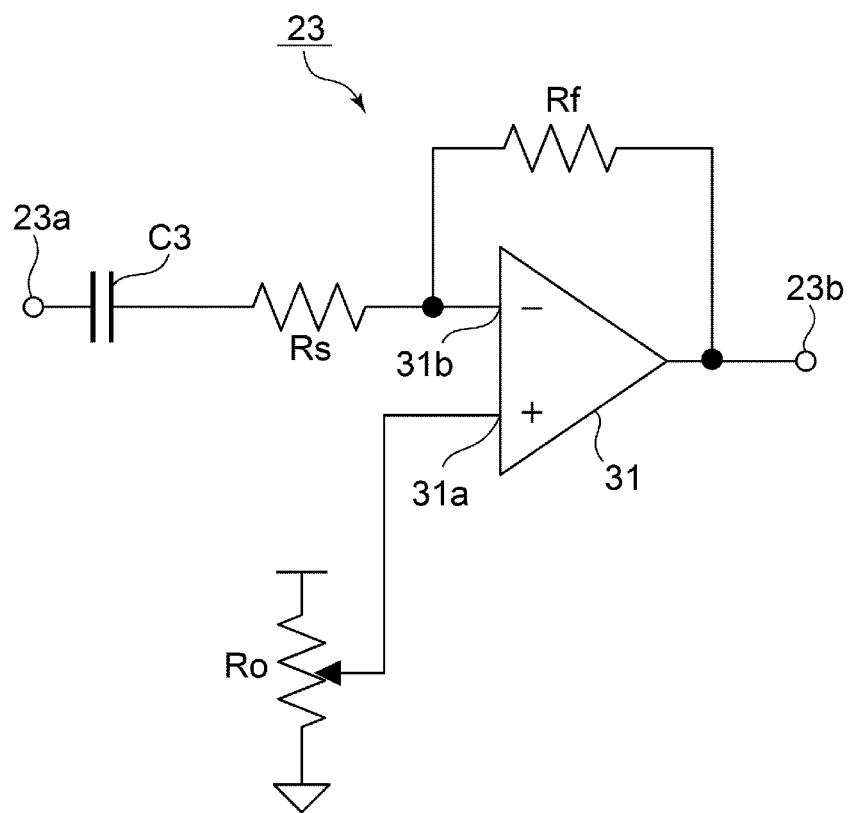
FIG. 7 is a circuit diagram for explaining a regulator that is used in the third preferred embodiment of the present invention.

FIG. 6A is a circuit diagram illustrating a voltage smoothing circuit according to a third preferred embodiment of the invention, and FIG. 7 is a circuit diagram illustrating a regulator that is used in the third preferred embodiment of the present invention.

A voltage smoothing circuit 21 illustrated in FIG. 6A includes the multilayer capacitor 1 including the first capacitance unit C1 and the second capacitance unit C2. Further, the voltage smoothing circuit 21 includes a regulator 23. The voltage smoothing circuit 21 is connected to a DC power supply 22 and outputs a current at a predetermined voltage to a load 24. The DC power supply 22 outputs the second voltage Vmon. The second voltage Vmon is applied to an input terminal 23a of the regulator 23. The regulator 23 outputs the first voltage Vreg corresponding to the second voltage Vmon from an output terminal 23b.

In the present preferred embodiment, the second outer electrode 7 is connected to the DC power supply 22. The first outer electrode 6 that is connected to the first capacitance unit C1 is connected to the output terminal 23b of the regulator 23. Accordingly, the third outer electrodes 8 are connected to a ground potential. Therefore, in the present preferred embodiment, an end portion of the first capacitance unit C1 at the first outer electrode 6 side corresponds to an end portion at the high-voltage side and an end portion of the first capacitance unit C1 at a node 26 side corresponds to an end portion at the low-voltage side. An end portion of the second capacitance unit C2 at the second outer electrode 7 side corresponds to an end portion at the high-voltage side and an end portion of the second capacitance unit C2 at the node 26 side corresponds to an end portion at the low-voltage side. That is to say, the end portion of the first capacitance unit C1 at the low-voltage side and the end portion of the second capacitance unit C2 at the low-voltage side are electrically connected.

Although the electrical connection between the first capacitance unit C1 and the second capacitance unit C2 preferably is established in the multilayer capacitor 1, that is, through the third inner electrodes 5 and the third outer electrodes 8, for example, the electrical connection may be established using a wire on a circuit board at the outside of the multilayer capacitor 1, for example.

In the present preferred embodiment, the first capacitance unit C1 and the second capacitance unit C2 are connected as described above and the load 24 is connected between the third outer electrodes 8 and the power supply voltage Vmon.

The regulator 23 includes a circuit configuration as illustrated in FIG. 7. That is to say, the regulator 23 includes the input terminal 23a and the output terminal 23b. An operational amplifier 31 is connected between the input terminal 23a and the output terminal 23b. The operational amplifier 31 includes a first input terminal 31a and a second input terminal 31b. A capacitor C3 and a resistor Rs are connected in series between the first input terminal 31a and the input terminal 23a. A resistor Rf is connected between the first input terminal 31a and the output terminal.

The operational amplifier 31, the resistor Rs, and the resistor Rf define an inverting amplifier.

The second input terminal 31b is connected to a variable resistor Ro. One end of the variable resistor Ro is connected to the ground potential and the other end thereof is connected to the power supply voltage.

In the present preferred embodiment, the above-mentioned inverting amplification circuit is included, so that the first voltage Vreg with a phase inverted with respect to that of the second voltage Vmon is applied to the first capacitance unit C1. Accordingly, the distortion on the first capacitance unit C1 and the distortion on the second capacitance unit C2 are cancelled by each other. In the present preferred embodiment, the input second voltage Vmon is converted into the first voltage Vreg by adjusting a value of the variable resistor Ro and the first voltage Vreg is output from the output terminal 23b.

The value of the first voltage Vreg can be calculated in the same manner as in the first and second preferred embodiments. That is to say, the first voltage Vreg may be calculated using the second correspondence table containing the correspondence relationship between the second voltage Vmon and the first voltage Vreg that has been defined in advance in accordance with the second voltage Vmon. With this, in the present preferred embodiment as well, the residual component of the distortion is significantly reduced by performing control such that when the potential difference ΔV2 which is applied to the second capacitance unit increases, the potential difference ΔV1 which is applied to the first capacitance unit C1 decreases and when the potential difference ΔV2 decreases, the potential difference ΔV1 increases.

In the present preferred embodiment, the first voltage Vreg is controlled by changing the resistance value of the variable resistor Ro. However, the magnitude of the first voltage Vreg is also capable of being adjusted by adjusting an amplification factor of the operational amplifier, that is, a ratio between the resistor Rf and the resistor Rs.

Accordingly, a first correspondence table 18A illustrated in FIG. 6B may be stored in a first memory 16A.

The first correspondence table 18A describes correspondence between the value of the variable resistor Ro as an offset resistor or the amplification factor and the second voltage Vmon.

It should be noted that adjustment of both of the variable resistor Ro and the operational amplification factor may be used.

Although the multilayer capacitor that is included in the first to third preferred embodiments is illustrated in FIG. 2 and FIGS. 3A to 3C, a multilayer capacitor including the first and second capacitance units that are included in preferred embodiments of the present invention is not limited thereto.

Figure 8:
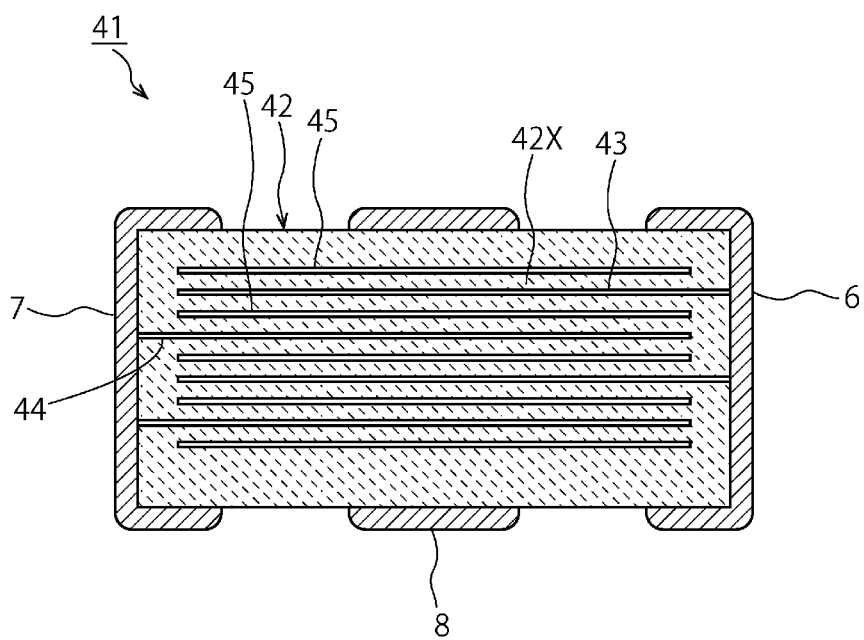
FIG. 8 is a front cross-sectional view for explaining a variation of the multilayer capacitor that is used in a voltage smoothing circuit according to a preferred embodiment of the present invention.
Figure 9A:
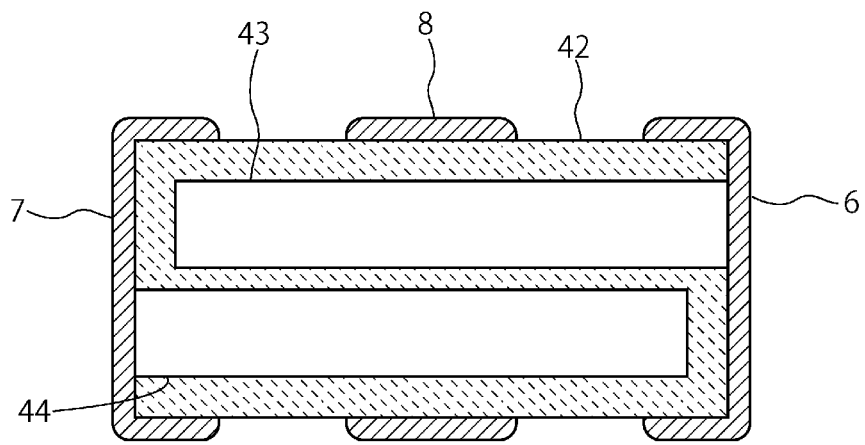
FIGS. 9A to 9C are planar cross-sectional views for explaining the variation of the multilayer capacitor that is included in the voltage smoothing circuit according to a preferred embodiment of the present invention.
Figure 9B:
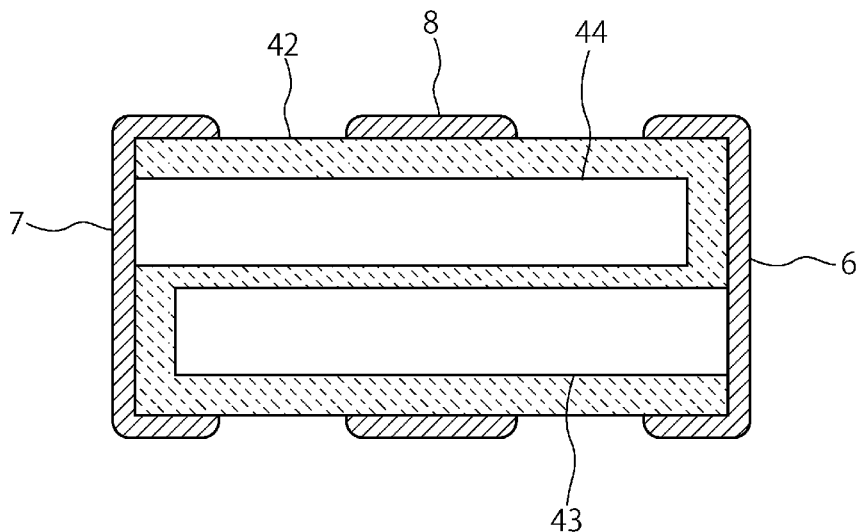
Figure 9C:
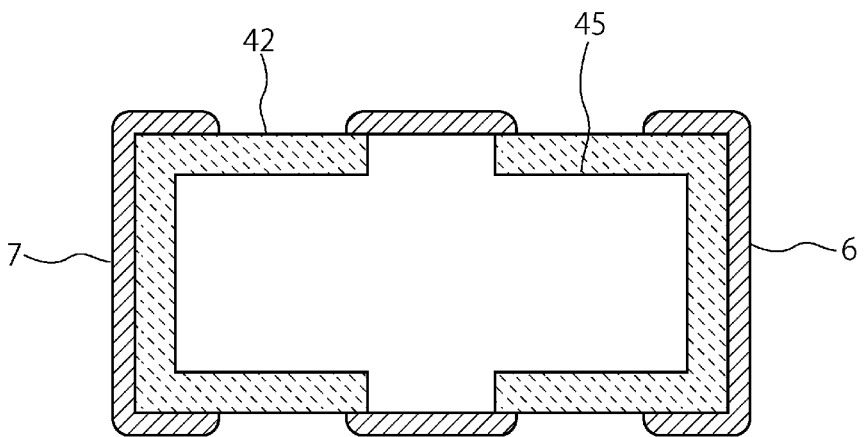

FIG. 8 and FIGS. 9A to 9C illustrate a variation of the multilayer capacitor that is included in the voltage smoothing circuit in preferred embodiments of the present invention. FIG. 8 is a front cross-sectional view and FIGS. 9A to 9C are planar cross-sectional views.

A multilayer capacitor 41 includes a multilayer body 42. In the multilayer body 42, dielectric layers 42X, first inner electrodes 43, second inner electrodes 44, and third inner electrodes 45 are stacked. The first inner electrode 43, the second inner electrodes 44, and the third inner electrodes 45 are arranged in the multilayer body 42. In the present preferred embodiment, as illustrated in FIG. 9A, the first inner electrode 43 and the second inner electrode 44 are provided in parallel or substantially in parallel in the direction perpendicular or substantially perpendicular to the stacking direction at a certain height position. The second inner electrode 44 and the first inner electrode 43 are also aligned in the direction perpendicular or substantially perpendicular to the stacking direction at another height position. A portion on which the first inner electrode 43 and the third inner electrode 45 overlap with the dielectric layer provided therebetween defines a first capacitance unit. A portion on which the second inner electrode 44 and the third inner electrode 45 overlap with the dielectric layer 42X provided therebetween defines a second capacitance unit. Other points are the same as those of the multilayer capacitor 1.

The first capacitance unit and the second capacitance unit may be aligned in the direction perpendicular or substantially perpendicular to the stacking direction as in the multilayer capacitor 41. In the voltage smoothing circuit in each of the above-described preferred embodiments, a voltage with less distortion is able to be output from the voltage smoothing circuit by controlling the voltage which is applied to the multilayer capacitor 1 in the above-described manner.

According to preferred embodiments of the present invention, distortion on the multilayer capacitor as a whole is significantly reduced or prevented. Therefore, when a multilayer capacitor that is easy to generate acoustic noise is used, preferred embodiments of the present invention are particularly effective. Examples of the multilayer capacitor of this type include a multilayer ceramic capacitor having high capacitance, a multilayer ceramic capacitor in which a large number of inner electrodes are stacked, a multilayer ceramic capacitor in which the dielectric layers interposed between the inner electrodes have small thicknesses, in addition to the above-described multilayer ceramic capacitor using the dielectric body having a high relative dielectric constant.

To be more specific, in the multilayer ceramic capacitor having an electrostatic capacitance of equal to or higher than about 1 μF, in particular, equal to or higher than about 10 μF, for example, acoustic noise is easily generated. Therefore, preferred embodiments of the present invention are more effective.

Further, preferred embodiments of the present invention are also particularly effective in a multilayer ceramic capacitor including a dielectric body having a relative dielectric constant of equal to or higher than about 3000. In addition, preferred embodiments of the present invention are also particularly effective when a multilayer ceramic capacitor in which the dielectric layers interposed between the inner electrodes have a thickness of equal to or smaller than about 1 μm, for example, is included.

Further, the voltage smoothing circuits according to preferred embodiments of the present invention are capable of being used in various power supply portions. In particular, the voltage smoothing circuits according to preferred embodiments of the present invention are preferably used in the following voltage conversion circuits such as a DC-to-DC conversion circuit, a charge pump, and an AC-to-DC converter.

Figure 10:
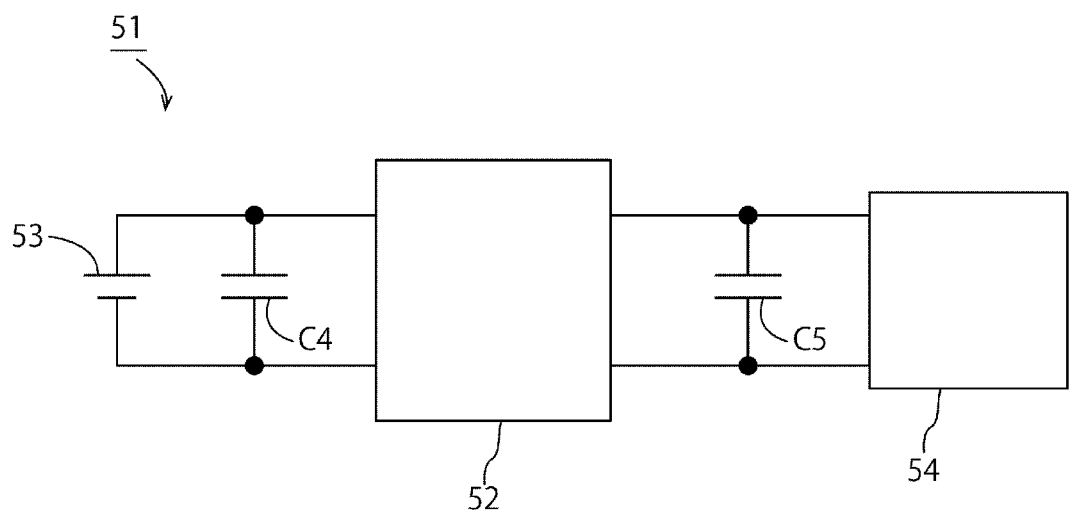
FIG. 10 is a circuit diagram for explaining a DC-to-DC conversion circuit to which the voltage smoothing circuit according to a preferred embodiment of the present invention is applied.

A DC-to-DC conversion circuit 51 illustrated in FIG. 10 includes a DC-to-DC conversion circuit unit 52. The DC-to-DC conversion circuit unit 52 is connected to a power supply 53. A capacitor C4 is connected between the power supply 53 and the DC-to-DC conversion circuit unit 52. A capacitor C5 is connected between the DC-to-DC conversion circuit unit 52 and a load circuit 54. The above-described voltage smoothing circuit preferably may include the capacitor C4 and/or the capacitor C5. To be more specific, the capacitor C4 preferably may be used as the first capacitance unit and the capacitor C5 preferably may be used as the second capacitance unit. Alternatively, the capacitor C4 preferably may be divided into two capacitance units and the two capacitance units preferably may be used as the first capacitance unit and the second capacitance unit. Moreover, the capacitor C5 may be divided into two capacitance units and the two capacitance units may be used as the first capacitance unit and the second capacitance unit. In any of the cases, acoustic noise that is generated from the DC-to-DC conversion circuit 51 is significantly reduced or prevented.

Figure 11:
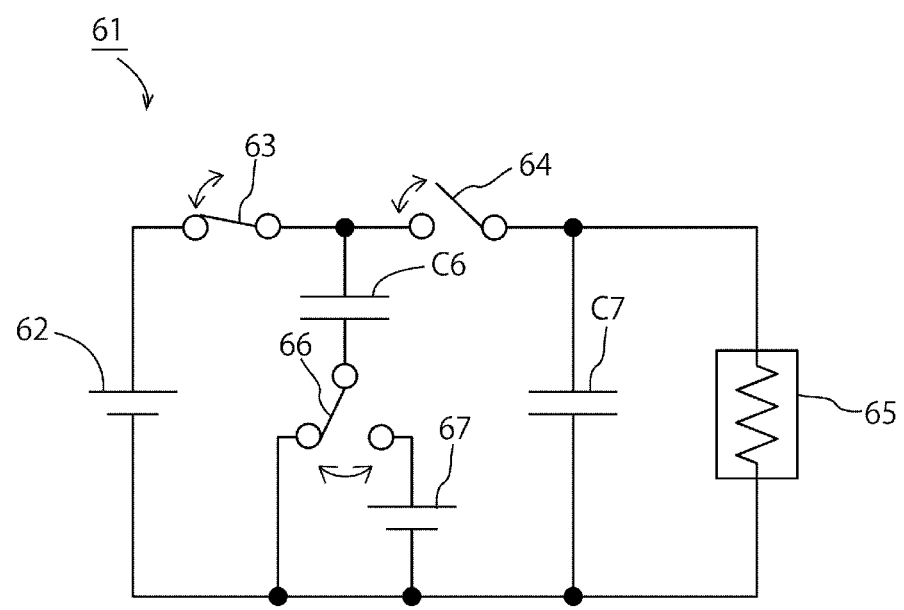
FIG. 11 is a circuit diagram illustrating an example of a charge pump to which the voltage smoothing circuit according to a preferred embodiment of the present invention is applied.

In a charge pump circuit 61 illustrated in FIG. 11, a load 65 is connected to a power supply 62 through switches 63 and 64. A capacitor C7 is connected in parallel with the load 65. One end of a capacitor C6 is connected to a node between the switch 63 and the switch 64. The other end of the capacitor C6 is connected to a switch 66. One of first and second end portions of the switch 66 at the side opposite to the side at which the capacitor C6 is connected preferably is connected to a power supply 67. The above-described voltage smoothing circuit of preferred embodiments of the present invention preferably may be include the capacitor C6 and the capacitor C7 in the charge pump circuit 61. To be more specific, the capacitor C6 preferably may be used as the first capacitance unit and the capacitor C7 preferably may be used as the second capacitance unit. Alternatively, the capacitor C6 preferably may be divided into two capacitance units and the two capacitance units preferably may be used as the first capacitance unit and the second capacitance unit. Moreover, the capacitor C7 preferably may be divided into two capacitance units and the two capacitance units preferably may be used as the first capacitance unit and the second capacitance unit. In any of the cases, acoustic noise that can be generated by a ripple is significantly reduced or prevented.

Figure 12:
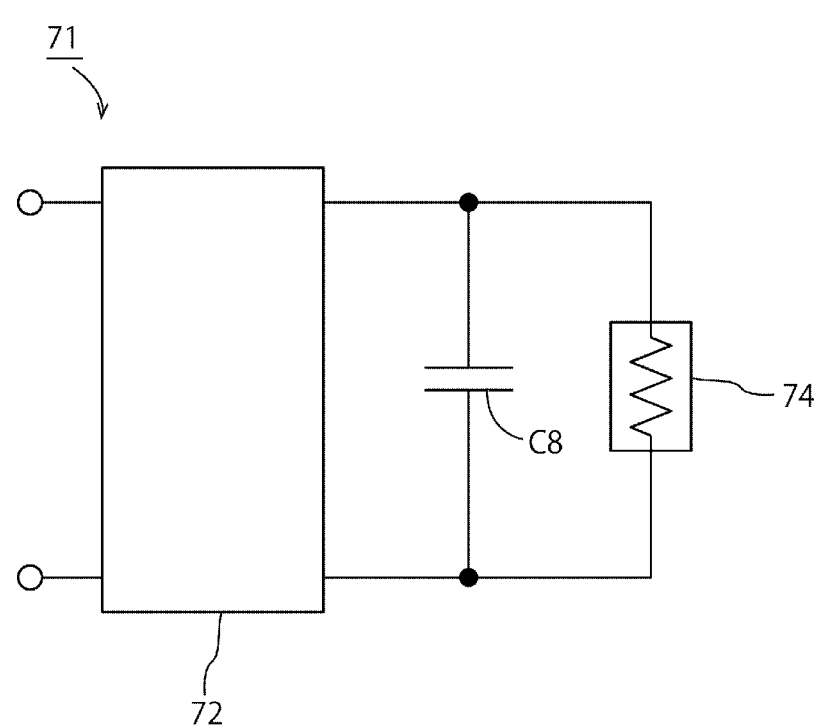
FIG. 12 is a circuit diagram illustrating an example of an AC-to-DC converter to which the voltage smoothing circuit according to a preferred embodiment of the present invention is applied.

An AC-to-DC converter 71 illustrated in FIG. 12 includes an AC-to-DC conversion circuit unit 72. A load 74 is connected to the AC-to-DC conversion circuit unit 72. A capacitor C8 is connected in parallel to the load 74. The capacitor C8 preferably may be included in the above-described voltage smoothing circuit in the invention. In this case, the voltage smoothing circuit is provided between the AC-to-DC conversion circuit unit 72 and the load 74, thus effectively suppressing acoustic noise.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A voltage smoothing circuit for smoothing a voltage, the circuit comprising:
   a multilayer capacitor which includes a first capacitance unit and a second capacitance unit; and
   a regulator which includes an input terminal and an output terminal, the input terminal being electrically connected to the second capacitance unit, the output terminal being electrically connected to the first capacitance unit; wherein
   the regulator calculates a first voltage which is applied to the first capacitance unit based on a second voltage which is applied to the input terminal and outputs the first voltage from the output terminal such that a potential difference which is applied to the first capacitance unit decreases when a potential difference which is applied to the second capacitance unit increases, and the potential difference which is applied to the first capacitance unit increases when the potential difference which is applied to the second capacitance unit decreases.

2. The voltage smoothing circuit according to claim 1, wherein each of the first capacitance unit and the second capacitance unit includes an end portion at a high-voltage side and an end portion at a low-voltage side, the end portion of the second capacitance unit at the high-voltage side is electrically connected to the first capacitance unit, and the first voltage is higher than the second voltage.

3. The voltage smoothing circuit according to claim 1, wherein the regulator calculates the first voltage while an average value of voltages that are input in a predetermined period of time is set as the second voltage.

4. The voltage smoothing circuit according to claim 1, wherein the regulator calculates the first voltage and a voltage that has been actually input is set as the second voltage.

5. The voltage smoothing circuit according to claim 1, wherein each of the first capacitance unit and the second capacitance unit includes an end portion at a high-voltage side and an end portion at a low-voltage side, and the end portion of the first capacitance unit at the low-voltage side is electrically connected to the end portion of the second capacitance unit at the low-voltage side.

6. The voltage smoothing circuit according to claim 5, wherein the regulator includes an inverting amplification circuit that outputs an output voltage with a phase inverted with respect to a phase of an input voltage.

7. The voltage smoothing circuit according to claim 6, further comprising:
a first memory storing a first correspondence table containing a correspondence relationship between the input voltage of the inverting amplification circuit defining the second voltage and an amplification factor or an offset resistance value; wherein
the regulator controls a magnitude of the first voltage based on the first correspondence table.

8. The voltage smoothing circuit according to claim 1, further comprising:
a second memory storing a second correspondence table containing a correspondence relationship between the second voltage and the first voltage corresponding to the second voltage; wherein
the regulator outputs the first voltage corresponding to a value of the second voltage based on the second correspondence table.

9. The voltage smoothing circuit according to claim 1, wherein
the multilayer capacitor includes:
a multilayer body including a stack of a plurality of dielectric layers;
a first inner electrode, a second inner electrode, and a third inner electrode arranged in the multilayer body; and
a first outer electrode, a second outer electrode, and a third outer electrode provided on outer surfaces of the multilayer body; wherein
the first outer electrode, the second outer electrode, and the third outer electrode are electrically connected to the first inner electrode, the second inner electrode, and the third inner electrode, respectively,
the first capacitance unit is defined by a portion on which the first inner electrode and the third inner electrode oppose each other with the dielectric layer interposed; and
the second capacitance unit is defined by a portion on which the second inner electrode and the third inner electrode oppose each other with the dielectric layer interposed.

10. The voltage smoothing circuit according to claim 9, wherein the first capacitance unit and the second capacitance unit are arranged in a stacking direction in the multilayer capacitor.

11. The voltage smoothing circuit according to claim 9, wherein the first capacitance unit and the second capacitance unit are arranged in a direction perpendicular or substantially perpendicular to the stacking direction in the multilayer capacitor.

12. The voltage smoothing circuit according to claim 1, wherein the first capacitance unit and the second capacitance unit are electrically connected to each other in the multilayer capacitor.

13. The voltage smoothing circuit according to claim 1, wherein the first capacitance unit and the second capacitance unit are electrically connected to each other outside of the multilayer capacitor.

14. The voltage smoothing circuit according to claim 9, wherein the first outer electrode is connected to the outer terminal of the regulator, and the third outer electrode is connected to a ground potential.

15. The voltage smoothing circuit according to claim 1, wherein the regulator includes an operational amplifier connected between the input terminal and the output terminal.

16. The voltage smoothing circuit according to claim 15, wherein the regulator includes a capacitor and a resistor connected between a first input terminal and a second input terminal of the operational amplifier.

17. A voltage conversion circuit comprising:
a power supply;
a voltage conversion circuit unit connected to the power supply; and
a multilayer capacitor connected to at least one of an input side and an output side of the voltage conversion circuit unit; wherein
the multilayer capacitor includes the voltage smoothing circuit according to claim 1.

18. The voltage conversion circuit according to claim 17, wherein the voltage conversion circuit is one of a DC-to-DC conversion circuit, a charge pump, and an AC-to-DC converter.

19. A method for controlling a voltage to be applied to a multilayer capacitor in a voltage smoothing circuit including the multilayer capacitor, the method comprising steps of:
detecting a second voltage which is applied to a second capacitance unit of the multilayer capacitor including a first capacitance unit and the second capacitance unit;
calculating a first voltage based on the detected second voltage such that a potential difference which is applied to the first capacitance unit decreases when a potential difference which is applied to the second capacitance unit increases, and the potential difference which is applied to the first capacitance unit increases when the potential difference which is applied to the second capacitance unit decreases; and
applying the calculated first voltage to the first capacitance unit.

* * * * *